United States Patent [19]

Margraf et al.

[11] 4,390,390

[45] Jun. 28, 1983

[54] LABEL APPLICATOR DEVICE

[75] Inventors: Dallas A. Margraf, Spring Valley; Fritz F. Treiber, Centerville, both of Ohio

[73] Assignee: Hobart Corporation, Troy, Ohio

[21] Appl. No.: 258,964

[22] Filed: Apr. 30, 1981

[51] Int. Cl.[3] .......................... B65C 9/00; B32B 1/00; B65B 61/00

[52] U.S. Cl. ...................................... 156/566; 53/137; 156/583.1; 156/DIG. 18; 156/DIG. 42

[58] Field of Search ............... 156/360, 364, 384, 539, 156/542, 584, 387, 556, 566, 84, 443, 499, 583.1, 584, DIG. 2, DIG. 18, DIG. 28, DIG. 37, DIG. 42; 177/5; 53/137

[56] References Cited

U.S. PATENT DOCUMENTS

| | | | |
|---|---|---|---|
| 3,194,710 | 7/1965 | Stremke et al. | 156/360 |
| 3,732,966 | 5/1973 | Treiber | 198/21 |
| 3,878,909 | 4/1975 | Treiber | 177/145 |
| 3,985,603 | 10/1976 | Berner | 156/235 |
| 3,985,605 | 10/1976 | Treiber et al. | 156/384 |
| 4,124,429 | 11/1978 | Crankshaw | 156/584 X |
| 4,191,605 | 3/1980 | Katterheinrich | 156/285 |

*Primary Examiner*—William A. Powell
*Assistant Examiner*—Thomas Bokan
*Attorney, Agent, or Firm*—Biebel, French & Nauman

[57] ABSTRACT

A label applicator device for applying a label to the surface of a substantially rectangular package in a selected orientation includes a package conveyor for presenting a package at an applicator station, control means for manually selecting a first or a second label orientation, and applicator means. The applicator means is responsive to a control means and receives a label at an output station. The applicator means applies the label to the surface of the package in a first orientation with respect to the package or in a second orientation with respect to the package. The second orientation is rotated approximately 90° with respect to the first orientation. The applicator means includes a cam and cam follower arrangement which provides for rotation of a portion of an applicator head which engages each label.

10 Claims, 14 Drawing Figures

LABEL APPLICATOR DEVICE

BACKGROUND OF THE INVENTION

The present invention relates to a label applicator device and, more particularly, to an applicator device which is capable of applying labels automatically to packages at an applicator station, with the orientation of the labels on the packages being selected by an operator.

Automatic labeling devices are used in supermarkets, stores, and other businesses for packaging meat, produce, and other items, conveying the packages to a weighing scale, computing the price of each package in accordance with its measured weight, printing a label with the computed price for each package, and applying the printed labels to the packages. One such prior art device is shown in U.S. Pat. No. 3,878,909, issued Apr. 22, 1975, to Treiber, and assigned to the assignee of the present invention.

The Treiber '909 patent discloses a device which weighs each package and then conveys the package to a label application station. A label printer prints a label indicating the weight, price per pound, and total price of the package, and the label is transported by a belt conveyor to a label output station. An applicator head, positioned above the label output station, engages the label by means of a suction supplied through a suction opening in the bottom of the head. The applicator head is lowered by a mechanical linkage arrangement and the label is pressed against the top of the package. An electrical heater in the applicator head heats the label before it is applied to the top of the package so as to activate a heat sensitive adhesive coating on the label. The package is then conveyed beneath a roller which presses the label down firmly, ensuring that the label is firmly attached to the package.

Typically, each of the packages is conveyed through the weighing and labeling system with one of its longer edges being the leading edge, since the automatic wrapping and packaging system from which the weighing and labeling system receives the packages commonly provides them in this orientation. As a result the orientation of the label on each of the packages handled by the weighing and labeling system is the same. It will be appreciated that it may be desirable for the grocer to be able to select the orientation of the labels applied by such a system. As an example, a grocer may wish to arrange packages of meat in the refrigerated meat display case with either the longer or the shorter of the package edges being parallel to the front of the display case. If labels are applied to the packages with a label applicator device in which the orientations of the labels may not be altered, certain arrangements of the packages in the display case will result in the labels being oriented with the lines of characters running vertically rather than horizontal. As a consequence, the labels will not be as easy for customers to read.

Several different approaches have been used in prior art devices to provide for selective orientation of labels which are automatically applied to packages. In one prior art label applicator, labels from a printer are conveyed to an applicator along a label path in which a pin may be interposed. The leading edge of each label strikes the pin, causing the label to rotate 90°, thereby reorienting the label prior to its application to a package. This approach is somewhat unreliable, however, since rotation of the label is accomplished while the label is largely unsupported, and is therefore somewhat uncontrolled.

A second prior art approach is to reorient the packages as they are conveyed from the automatic wrapping and packaging system to the label application station. This unduly complicates the conveyor mechanism. Additionally, in conveyors of the type shown in the Treiber '909 patent in which packages are moved forward by means of rows of vertical package engaging fingers, the dimension of a package in the direction of conveyor movement cannot be greater than the distance between successive rows of fingers. As a consequence, while it may be possible to convey a relatively large package with a longer edge being the leading edge, it may not be possible to convey the package after it is rotated by 90°.

Accordingly, it is seen that there is a need for a label applicator device which is capable of applying labels to packages in either of two operator selected orientations without the need for reorienting the packages.

SUMMARY OF THE INVENTION

A label applicator device for applying a label to the surface of a substantially rectangular package in a selected orientation includes a package conveyor means for presenting a package at an applicator station, and a control means for selecting first or second label orientations. An applicator means is responsive to the control means for receiving a label at a label output station and for applying the label to the surface of the package. The label is applied in a first orientation with respect to the package or in a second orientation with respect to the package. The second orientation is rotated approximately 90° with respect to the first orientation.

The applicator means includes means for receiving a label at a label output station and either applying the label to the package surface after rotation of the label in its plane by approximately 90°, or applying the label to the package surface without rotation of the label. The control means may comprise manually actuatable control means which is movable between a first control position in which said first orientation is selected and a second control position in which said second orientation is selected.

The applicator means includes an applicator head having a rotatable head portion and a nonrotatable head portion. The rotatable head portion defines a vacuum opening in a label contacting surface. The applicator means further includes means for moving the head to the label output station for receipt by the head of a label on the label contacting surface and for moving the head from the label output station to the label applicator station. Further, the applicator means includes means, responsive to the manually actuatable control means, for rotating the rotatable portion of the head after a label is received thereby and prior to application of the label to a package, whereby the label may be rotated in its plane by approximately 90°.

The label output station may be positioned substantially above the applicator station and the means for moving the head may include means for vertically moving the head between the label output station and the applicator station. A label may thus be applied to the top surface of a package. The means for moving the head may include head support means, attached to the nonrotatable head portion, for supporting the head, and head drive means for raising and lowering the head support means.

The means, responsive to the manually actuatable control means, for rotating the rotatable head portion may comprise cam means defining a stationary cam surface, cam follower means mounted on the head support means in contact with the cam surface, means for biasing the cam follower means and cam linkage means. The cam linkage means connects the cam follower means and the rotatable head portion and rotates the rotatable head portion as the cam follower means moves along the cam surface. The means for biasing the cam follower means may include spring means for urging the cam follower means into contact with the cam surface.

The cam means may include means defining a first cam surface and means, connected to the manually actuatable control means, defining a second cam surface. The first cam surface is configured to produce rotation of the rotatable head portion as the cam follower means moves therealong. The second cam surface is movable into position adjacent the first cam surface such that the cam follower means contacts the second cam surface instead of the first cam surface. The second cam surface is configured to prevent rotation of the rotatable head portion as the cam follower means moves therealong. The cam follower means contacts the first cam surface and the rotatable head portion is rotated when the manually actuatable control means is in the second control position. The cam follower means contacts the second cam surface and the rotatable head portion is not rotated when the manually actuatable control means is in the first control position. The manually actuable control means may comprise a control lever which is movable between first and second control positions.

The method of automatically applying a label to a package in a selected orientation includes the steps of:

(a) selecting either a first label orientation or a second label orientation, rotated approximately 90° with respect to said first label orientation, (b) engaging a label with a label applicator head at a label output station, (c) rotating a portion of the label applicator head when the second label orientation is selected, such that the label is reoriented into the selected orientation, and (d) moving the label applicator head with the label engaged thereby into contact with a package at an application station.

The step of moving the label applicator head may include the step of moving the head with the label engaged thereby from the label output station and simultaneously rotating the label prior to contacting the package. The step of rotating the label may comprise the step of rotating the label by approximately 90°. The step of moving the head may include the step of lowering the head.

Accordingly, it is an object of the present invention to provide a label applicator device and method of applying a label to a package in a selected orientation in which an operator may control the orientation of the label; to provide such an applicator device and method in which a rotatable applicator head is rotated afer receipt of a label and prior to application of the label to the surface of a package; to provide such an applicator device and method in which a cam and cam follower arrangement is provided for controlling rotation of the rotatable head; and to provide such an applicator device and method in which the orientation of the labels applied to the packages is controlled by means of a manually operable control lever.

Other objects and advantages of the invention will be apparent from the following description, the accompanying drawings and the appended claims.

Figure 5:
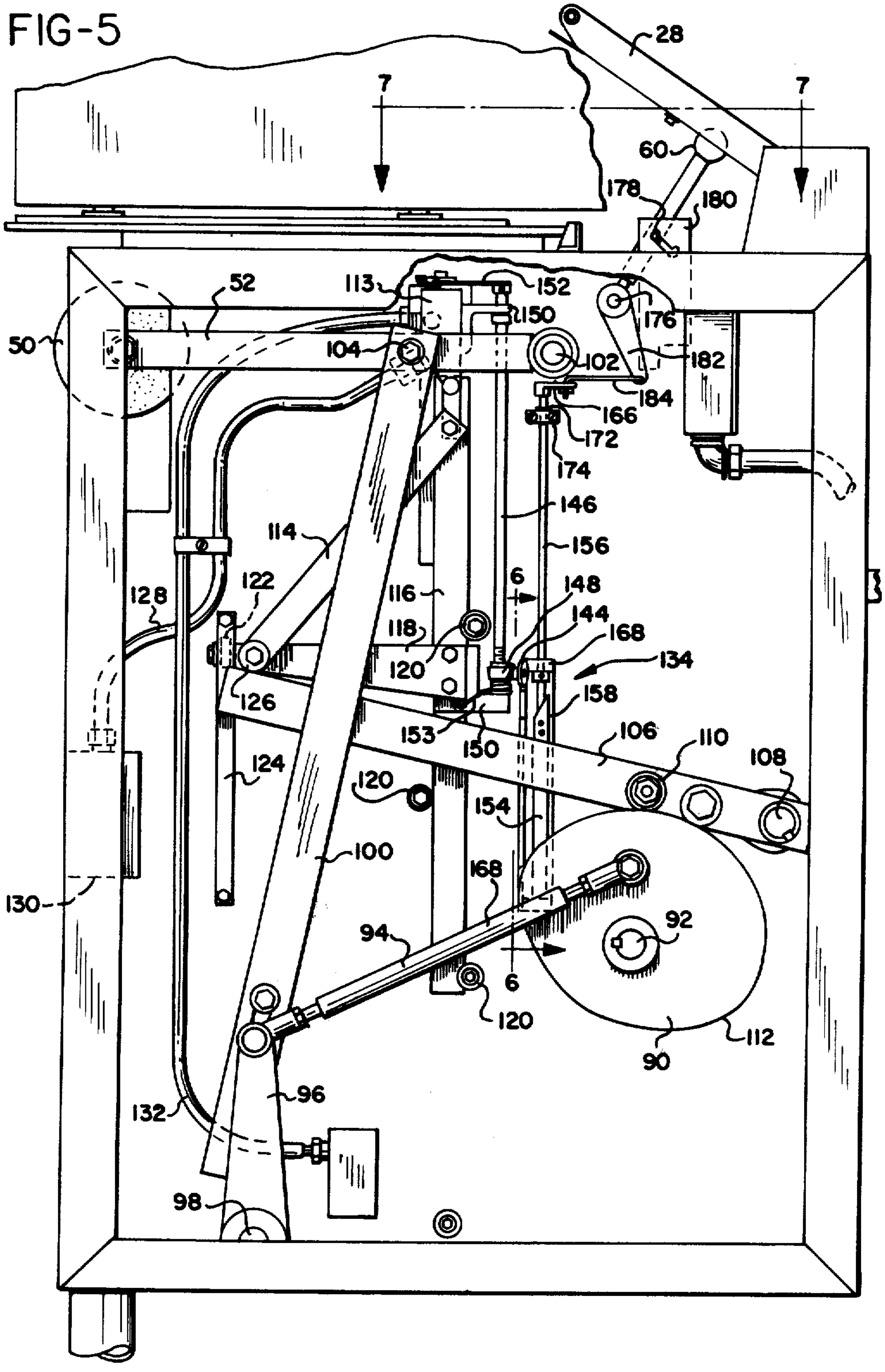
FIG. 5 is a view of the applicator device, as seen from the rear.
Figure 10:
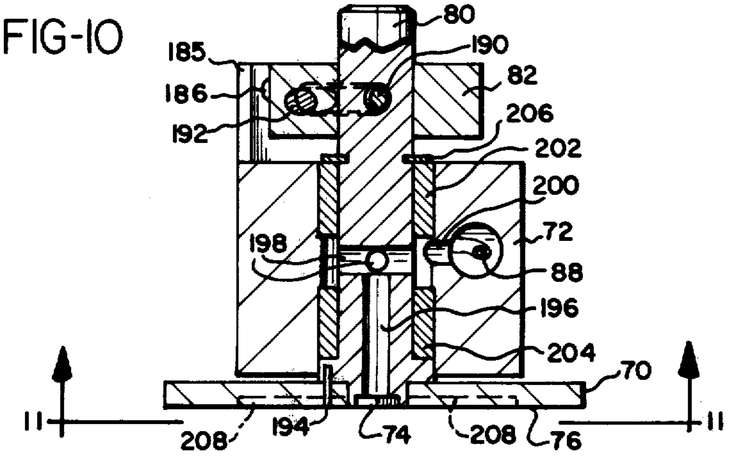
Figure 11:
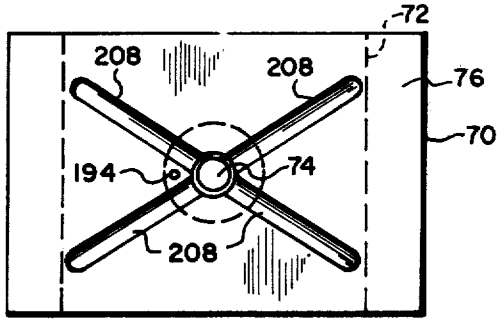
Figure 8:
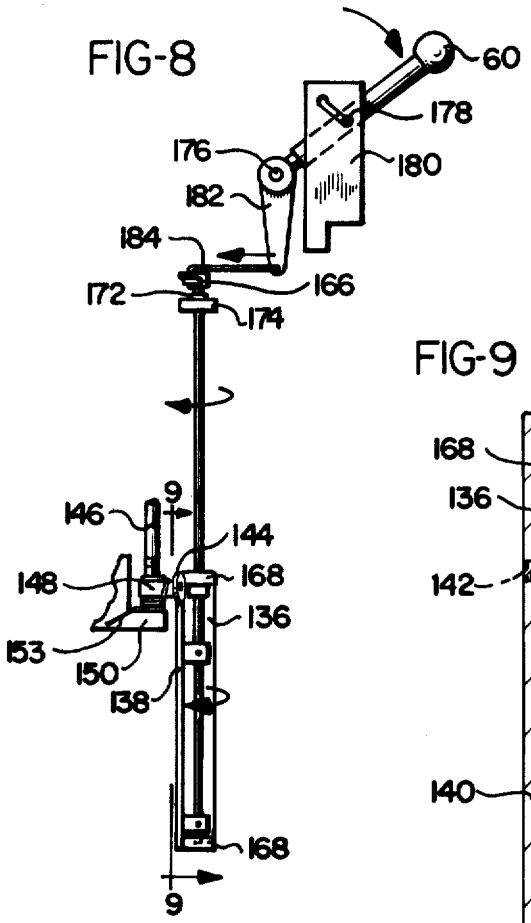
Figure 9:
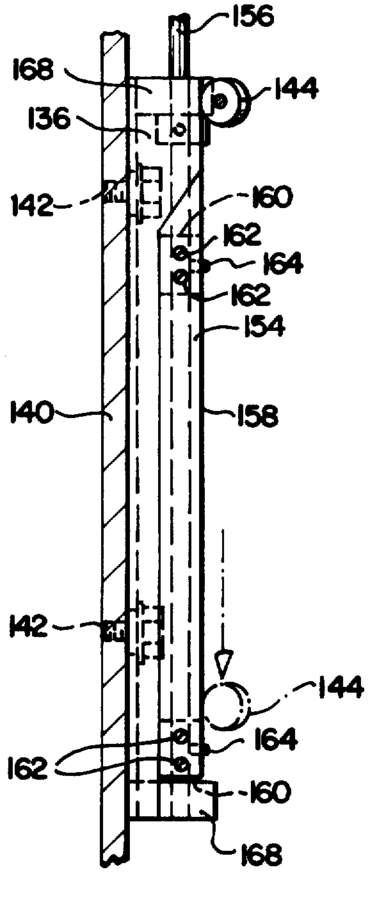

FIGS. *7a* and *7b* are enlarged partial views, taken generally along line 7—7 in FIG. 5;

FIG. 8 is a partial view of the manually actuatable control means, cam means, and cam follower means, similar to FIG. 5, but with the control lever actuated so as to prevent rotation of the applicator head;

FIG. 9 is an enlarged sectional view of the cam means and cam follower means, taken generally along line 9—9 in FIG. 8;

FIG. 10 is a sectional view of the applicator head, taken generally along line 10—10 in FIG. *7a;* and FIG. 11 is a bottom elevational view of the applicator head, taken generally along line 11—11 in FIG. 10.

DETAILED DESCRIPTION OF THE PREFERRED EMBODIMENTS

Figure 1:
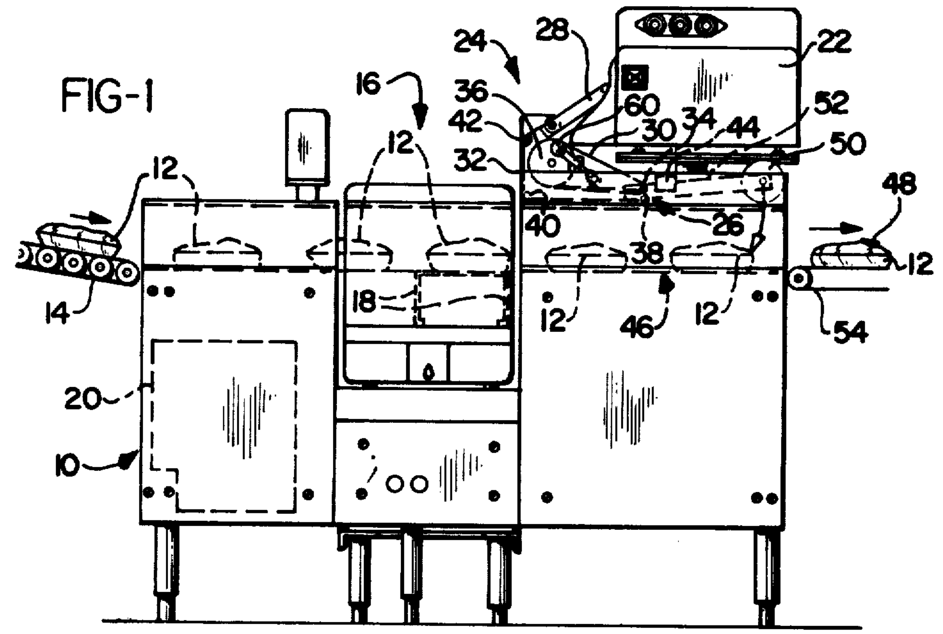
FIG. 1 is a front view of an automatic indexing, weighing, labeling, printing, and label application device of the type in which the label applicator device of the present invention may be utilized.

FIG. 1 is a front view of a weighing and labeling system of the type incorporating a label applicator device of the present invention. A loading and spacing station 10 is provided which receives packages 12 from a feed conveyor 14. Typically, conveyor 14 may receive packages from a wrapping machine (not shown) which wraps a paper or plastic tray or "boat" containing meat, produce, or other merchandise with a wrapping material which adheres to itself. The package may then be conveyed through a heat shrink tunnel to produce a tightly wrapped appearance. Alternatively, the packages may be wrapped by hand and manually loaded onto conveyor 14.

After packages 12 are properly positioned and spaced in the loading station 10, they are delivered to a weighing station 16 where, supported by upstanding ribs 18, they are individually weighed. A computer 20 computes the price of each package being weighed, based upon the weight of the package and a predetermined price per unit weight. The computer then stores this information and subsequently uses it to control printer 22. Printer 22 prints the computed price and usually the weight and price per unit weight of the package on a label. The printer may also print a machine readable bar code, packaging and shelf life information, a description of the packaged product, and other information on the label, if desired.

The printed label is then transported by a conveyor 24 to a label output station, indicated generally at 26. The printed label initially passes down a chute 28 and is engaged between an upper conveyor belt 30 and a lower pair of conveyor belts 32. Belt 30 passes around roller 34 and large roller 36, while belts 32 pass around large roller 36 and a number of smaller rollers, including rollers 38, 40, and 42.

The label is supported at the label output station 26, as described more fully below, and is then engaged by an applicator head 44. Applicator head 44 moves downward, carrying the label, and presses the label against the upper surface of a package positioned at applicator station 46. The applicator head 44 includes a vacuum opening to which a partial vacuum is supplied for holding the label on the head during the application process. The applicator head 44 also includes an electrical heater element which warms the label such that a layer of heat responsive adhesive on the label adheres to the package when the label is pressed against the top of the package 12.

Subsequently, the package 12, bearing label 48, is transported beneath a roller 50 which is moved downward into contact with the top of the package by roller support arm 52, as described more completely below. Roller 50, constructed of a relatively soft material such as foam rubber applies a gentle force to the top of the label 48 to ensure that it adheres securely to the upper surface of the package 12. The package 12 bearing label 48 is then delivered to an output conveyor 54, which may deliver the package 12 to a storage container. Alternatively, conveyor 54 may be replaced by a receiving bin which accumulates the labeled packages.

The above description summarizes the operation of an automatic weighing labeling device of the type disclosed more fully in U.S. Pat. No. 3,878,909, issued Apr. 22, 1975, to Treiber, and in U.S. Pat. No. 3,732,966, issued May 15, 1973, to Treiber, both of which are assigned to the assignee of the present invention. Reference may be made to the Treiber patents for a more complete disclosure of this system, including the conveying apparatus.

Figure 2:
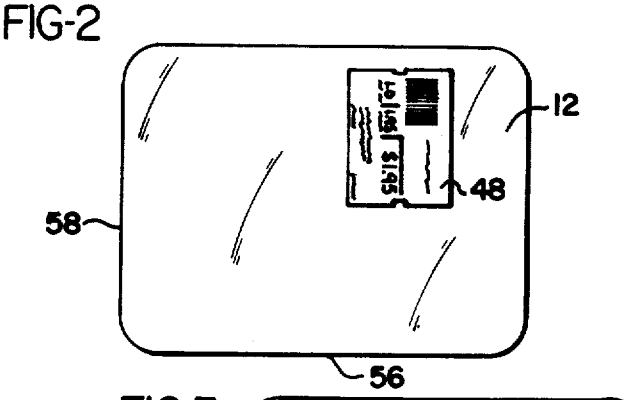
FIG. 2 is a plan view of a package showing a label applied in a first orientation.
Figure 3:
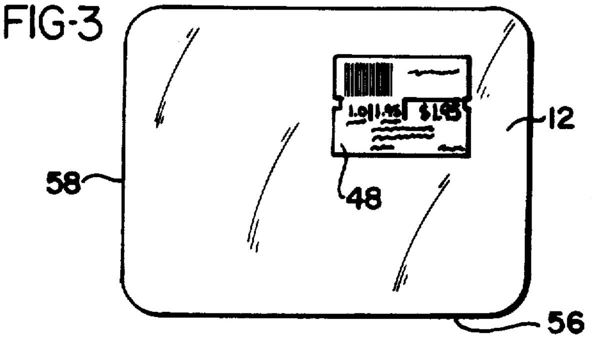
FIG. 3 is a plan view of a package showing a label applied in a second orientation.

FIGS. 2 and 3 illustrate a label 48 secured to the top of a package 12 in two different orientations. When package 12 is transported to the applicator station with longer edge 56 being a leading edge, label 48 is applied by prior art applicator devices as shown in FIG. 2. This label orientation is perfectly acceptable where a grocer intends to place package 12 in a display case with a shorter edge 58 of the package being parallel to the front of the case. Package 12 may be slightly propped up in the display case, if desired. Where the grocer wishes to place the package 12 in the display case with the longer edge 56 being parallel to the front of the case, however, it is desirable that the label 48 be oriented as shown in FIG. 3 so that the lines of printed characters extend from left to right. Such an orientation makes it easier for customers to read the label information. It should be noted that the orientation of the label 48, as shown in FIG. 3, is rotated by approximately 90° with respect to the label orientation depicted in FIG. 2.

In order to provide increased flexibility in labeling packages and to permit the grocer to control label application such that the packages may be labeled as shown in either FIGS. 2 or 3, the label applicator device of the present invention has a control means for manually selecting a first or a second label orientation, as shown in FIGS. 2 and 3, respectively. The control means includes a control lever 60 (FIG. 1) which is movable between a first control position, associated with the first label orientation, and a second control position, associated with the second label orientation.

Figure 4A:
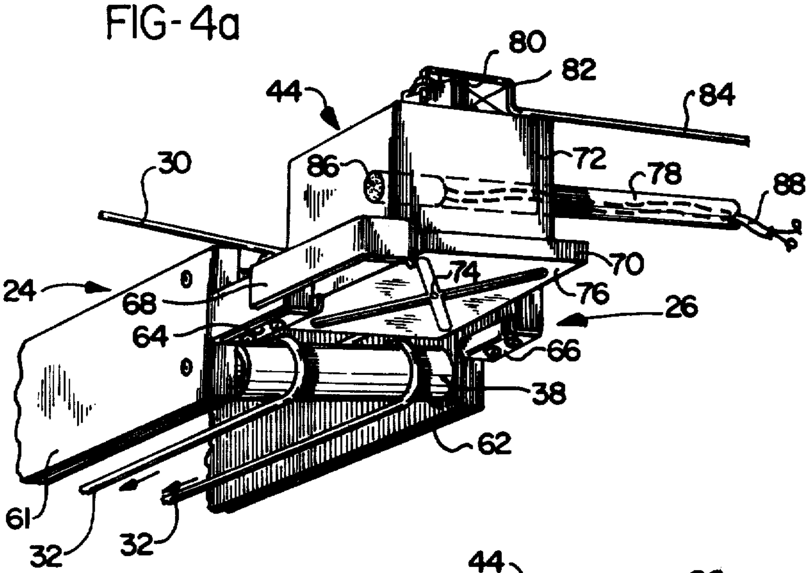
FIGS. 4*a*, 4*b*, and 4*c* are partial enlarged perspective views showing the label applicator head and the manner in which the head is rotated during label application.
Figure 4B:
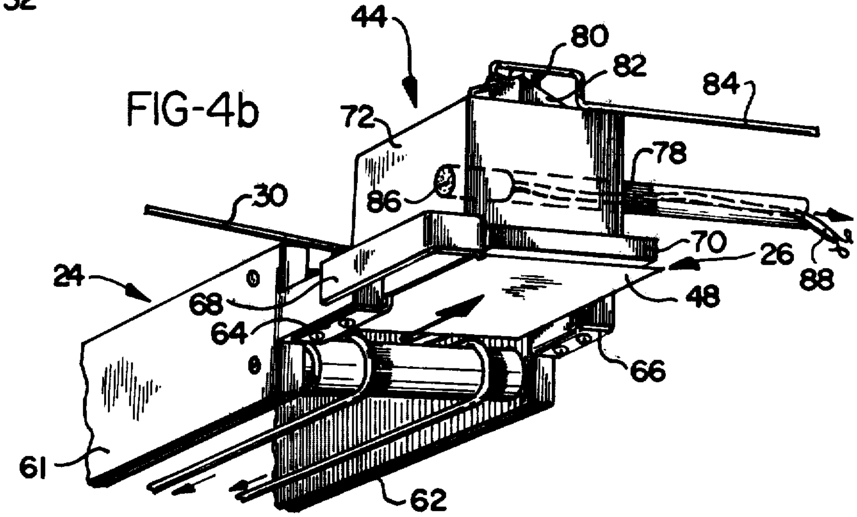
Figure 4C:
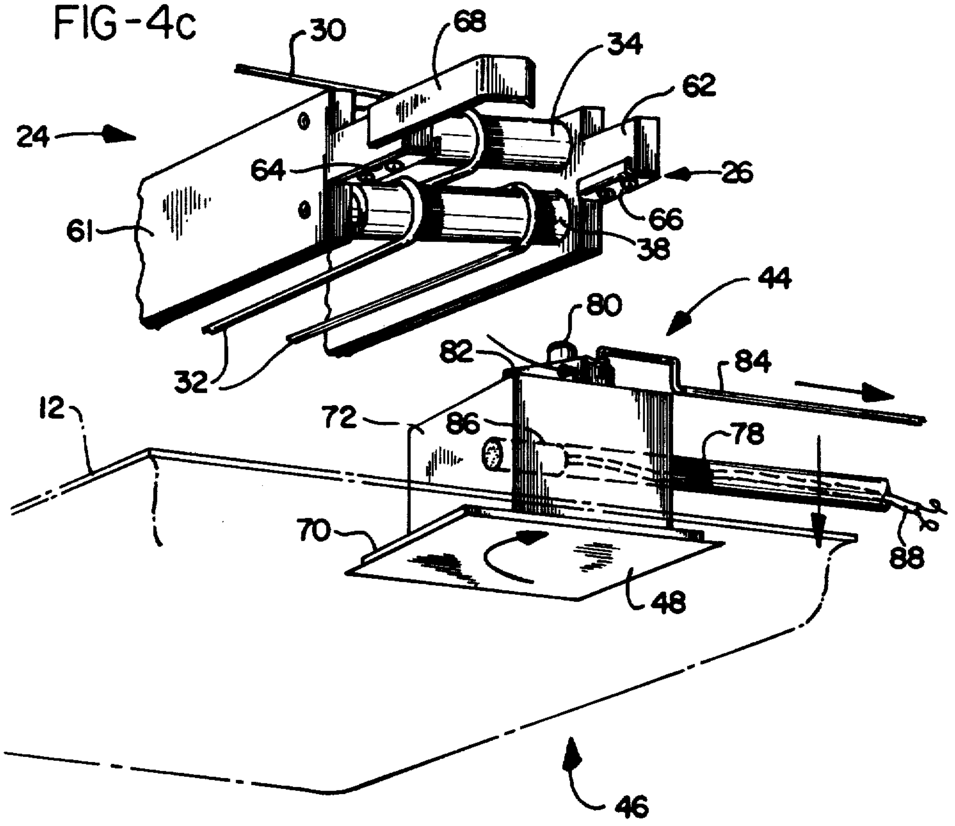

The label applicator device of the present invention includes an applicator means having an applicator head 44, as shown in FIGS. 4a, 4b, and 4c, which receives a label 48 at an output station, and either applies the label to a package 12 after rotation of the label in its plane by approximately 90° or applies the label to the package surface without rotation of the label, in dependence upon the label orientation selected by the control means. As described more completely below, when a first control position of the control lever is selected, as seen in FIGS. 8 and 9, the applicator means will apply a label in the first orientation, illustrated in FIG. 2. When, on the other hand, the control lever 60 is moved into its second control position, as shown in FIGS. 5, 6, 7a and 7b, the label received at the label output station 26 is applied to the package surface after rotation of the label in its plane by approximately 90°, thus producing a second label orientation shown in FIG. 3.

FIG. 4a illustrates the label applicator head 44 positioned above the label output station 26 prior to the delivery of a label to the output station 26 by conveyor 24. Rollers 34 and 38, around which conveyor belts 30 and 32 extend, respectively, are journaled in side plates 61 and 62. Label support brackets 64 and 66 are mounted on side plates 61 and 62, respectively, and define label support edges for supporting a label 48 as it is delivered to the label output station 26. Bracket 68, also mounted on side plate 61, defines a label stop edge which contacts the leading edge of a label as it is delivered to the output station 26 by the conveyor 24, as shown in FIG. 4b.

The applicator head 44 includes a rotatable head portion 70 and a nonrotatable head portion 72. The rotatable head portion 70 defines a vacuum opening 74 in a label contacting surface 76. As described more completely below, a partial vacuum supplied to the applicator head 44 from a conventional vacuum source through head support tube 78 holds the labels on surface 76 until they are applied to packages 12. A rotatable shaft 80, secured to rotatable portion 70, extends upward through and is journaled in nonrotatable head portion 72. Block 82, attached to shaft 80, is secured to linkage 84. The tube 78 provides the sole support for the applicator head 44 and is attached to the nonrotatable head portion 72.

After the label 48 is delivered to the output station 26 and engaged by the applicator head 44, the head is lowered as illustrated in FIG. 4c. If the control lever 60 is in its first control position, the label is simply lowered directly onto the upper surface of the package 12, positioned at the applicator station 46. If, on the other hand, the control lever is in its second control position, the block 82, shaft 80, and rotatable head portion 70 are rotated by linkage 84, such that the label 48 is rotated in its plane by approximately 90° prior to its application to the top surface of the package 12.

The applicator head 44 includes an electrical heater element 86, mounted in nonrotatable head portion 72. Heater element 86 is energized via electrical conductors 88 which pass through tube 78. Heater element 86 heats the label 48 such that a coating of heat sensitive adhesive on the bottom of label 48 is activated and adheres to the top surface of package 12 when the label is applied to the package.

After the label is pressed against package 12, the partial vacuum supplied to opening 74 is terminated.

The applicator head 44 is then raised into the position shown in FIG. *4a* in preparation for receipt of the next label supplied to the label output station 26 by conveyor 24. It will be appreciated that the rotatable head portion 70 is rotated by approximately 90° to its original orientation during the upward movement of the applicator head 44.

Figure 6:
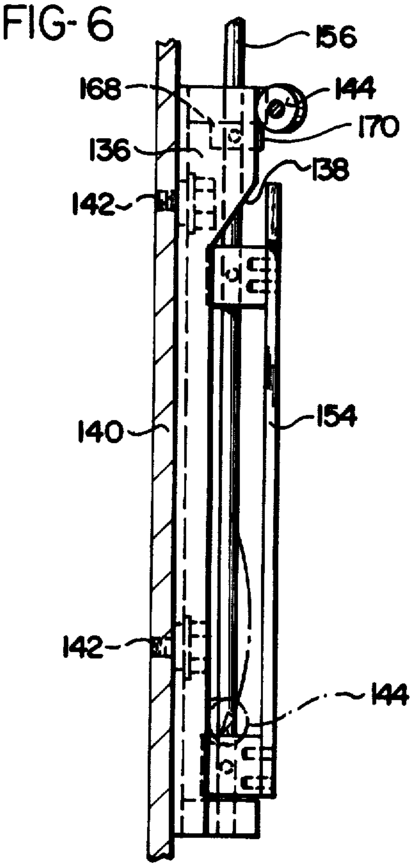
FIG. 6 is an enlarged partial sectional view, taken generally along line 6—6 in FIG. 5.
Figure 7A:
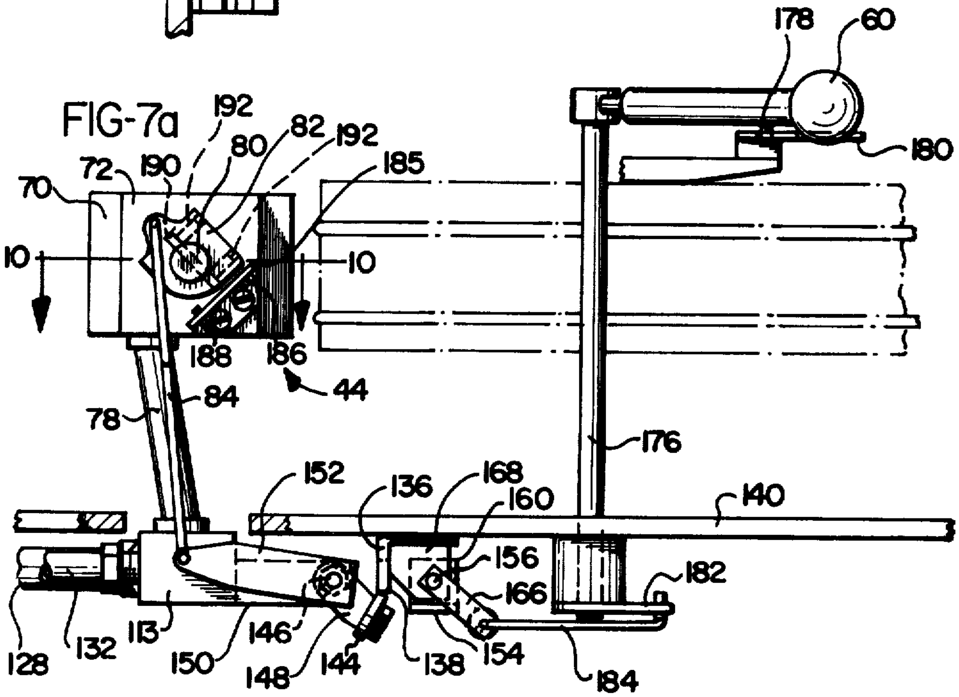
Figure 7B:
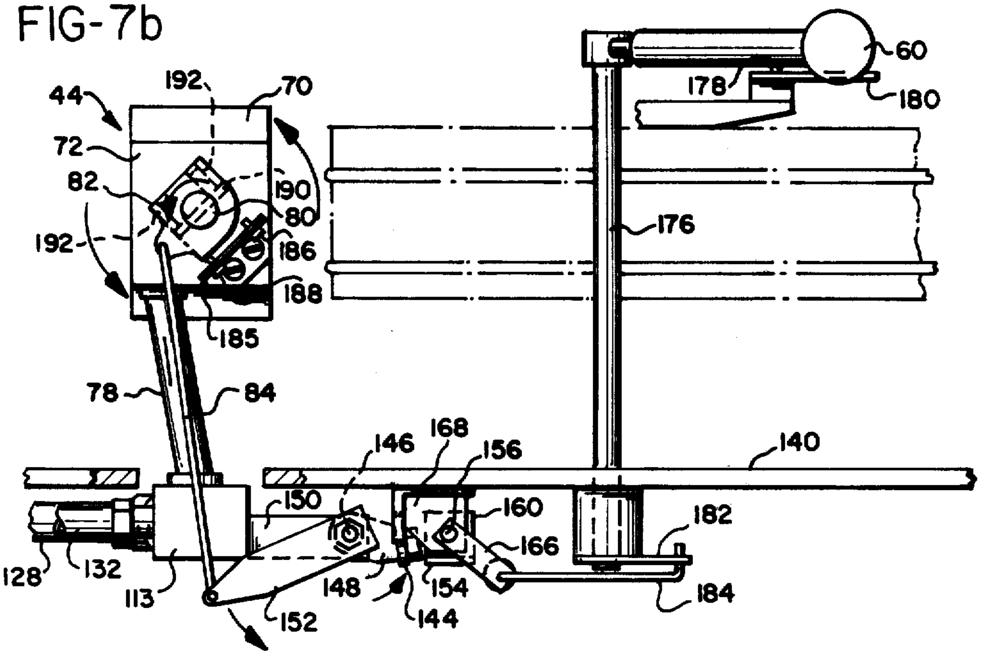

FIGS. 5, 6, *7a*, and *7b* illustrate the mechanism for raising and lowering the applicator head, while at the same time selectively rotating the rotatable head portion in dependence upon the position of control lever 60. A drive cam 90, attached to a shaft 92, is rotated by a motor (not shown). Pivotally attached to the side of cam 90 is a rod 94, which is also pivotlly attached to arm 96. Arm 96 is pivotally supported at 98 and has its upper end pivotally secured to link 100. Arm 52, pivotally mounted at 102, is pivotally secured to link 100 at 104. As cam 90 rotates, roller 50 is raised and lowered such that it presses against the top of each labeled package and ensures that the label on top of the package is securely adhesively bonded to the package.

An arm 106, pivotally mounted at 108, carries a cam follower roller 110 which contacts the peripheral camming surface 112 of the cam 90. As cam 90 is rotated, arm 106 is raised and lowered. A support block 113 is mounted to the top of a generally triangular support assembly consisting of plates 114, 116, and 118 which are attached at their ends into a rigid structure. Plate 116 is vertically movable between guide rollers 120. A roller 122 on the end of plate 118 contacts the back surface of retainer bar 124 and rides therealong to limit movement of the support assembly in a direction normal to the plane of FIG. 5.

As cam 90 is rotated, arm 106 is cyclically raised and lowered. Roller 126 mounted on plate 114 rides on top of arm 106 such that the triangular support assembly carrying support block 113 is cyclically raised and lowered. As seen in FIGS. *7a* and *7b*, support block 113 is connected to tube 78 which supports the applicator head 44. As a consequence, applicator head 44 is raised and lowered once during each rotation of cam 90. Thus, cam 90 and the associated linkages which raise and lower support block 113 act as a means for moving the applicator head 44 to the label output station for receipt by the head of a label and for moving the head 44 downward from the label output station 26 to the applicator station 46.

Electrical conductors 128 extend between the support block 113 and an electrical junction box 130, and provide power to the heater element 86 in the applicator head 44 through conductors 88 in tube 78. Similarly, a partial vacuum is supplied to tube 78 from vacuum line 132 via support block 113.

A cam means 134 is responsive to the control lever 60 for actuating link 84 and rotating the rotatable portion 70 of the head 44 after a label is received by the head 44 and prior to its application to a package. The cam means includes a bracket 136 defining a first stationary cam surface 138. Bracket 136 is secured to support plate 140 by means of screws 142 such that the bracket 136 and cam surface 138 remain stationary.

A cam follower means includes cam follower roller 144 which is secured to rotatable shaft 146 by arm 148. Shaft 146 is, in turn, journaled in brackets 150 attached to plate 116 such that rod 146 and cam follower roller 144 move vertically in synchronism with applicator head 44. Arm 152 is attached to the top of rod 146 and pivots therewith. Arm 152 is attached at its opposite end to linkage 84. A spring 153 engages lower bracket 150 and arm 148 and urges roller 144 into contact with cam surface 138.

As may be seen by a comparison of FIGS. *7a* and *7b*, and as illustrated in FIG. 6, as the cam follower roller 144 moves along cam surface 138, it passes over an inclined portion of the surface 138, with the result that rod 146 is rotated. Arm 152 moves in the direction indicated by the arrow in FIG. *7b* and, via link 84, pivots block 82 into the position shown in FIGS. *4c* and *7b*. Rotatable head portion 70 is thereby rotated as the applicator head 44 is lowered, thus providing for label reorientation. Arm 148, shaft 146, arm 152, and link 84 define a cam linkage means which connects the cam follower roller 144 and the rotatable head portion 70, and which rotates head portion 70 as the cam follower roller 144 moves along the cam surface 138.

The cam means 134 further includes member 154 which is mounted on shaft 156 and which defines a second cam surface 158. Member 154 is mounted on support blocks 160 by screws 162. Support blocks 160 are, in turn, attached to shaft 156 by means of set screws 164. Arm 166 is secured to the top of shaft 156 which is journaled in plates 168. Shaft 156 is limited in its vertical movement by retainer 170 secured to the shaft beneath plate 168 and retainer ring 172 secured to the shaft above support bracket 174. Note that for purposes of clarity, bracket 174 and retainer ring 172 are not illustrated in FIGS. *7a* and *7b*.

The control lever 60 is connected to shaft 176 which extends through and is supported by plate 140. If desired, control lever 60 may include a pin 178 which extends through a slot in plate 180. The lever 60 may be spring loaded such that the pin is urged into the detents at the ends of the slot in plate 180, thus holding the control lever 60 in its selected control position. As control lever 60 is pivoted, shaft 176 rotates, and arm 182 is rotated. This results in translation of link 184, thus causing the rotation of arm 166 to which link 184 is pivotally attached.

When control lever 60 is placed in its first control position, as illustrated in FIGS. 8 and 9, shaft 156 and member 154 are pivoted into the position shown in FIG. 9. Member 154 in effect alters the camming surface along which the cam follower roller 144 moves so as to prevent rotation of the shaft 146. Cam follower roller 144 does not move down the inclined portion of cam surface 138, but rather rides onto the cam surface 158. As a consequence, when the control lever 60 is in its first control position, the applicator head 44 is raised and lowered during the label application process without any rotation or reorientation of the label. By selecting the control position for the lever 60, the operator determines the orientation of the labels applied to packages at the applicator station.

FIGS. 10 and 11 show the details of construction of the applicator head 44. Mounted on the top of nonrotatable portion 72 is a stop bracket 185 which includes a pair of adjustable stop screws 186 and 188. As seen in FIGS. *7a* and *7b*, stop screws 186 and 188 contact the side of block 82 and provide a means for limiting the range of rotation of portion 70 to approximately 90°. Block 82 is secured to shaft 80 by means of a pin 190 which extends through block 82 and shaft 80 and is secured in place by means of set screws 192. Shaft 80 is attached to portion 70 by pin 194 and defines the vacuum opening 74 which communicates with tube 78 through a central bore 196 in the shaft via openings 198 and opening 200 in portion 72. Shaft 80 rotates within bushings 202 and 204 and is secured in place by means of clip 206. As seen in FIG. 11, rotatable portion 70 defines grooves 208 which distribute the partial vacuum from the opening 74 across the top of a label held on surface 76.

While the label applicator device of the present invention has been described in conjunction with a labeling system using labels having a heat sensitive adhesive coating, it will be appreciated that other types of adhesive backed labels may be applied by this device. For example, the applicator of the present invention may be utilized, with appropriate modification of the conveyor 24 and the label output station 26, to apply labels having a pressure sensitive adhesive backing.

While the method herein described, and the form of apparatus for carrying this method into effect, constitute preferred embodiments of the invention, it is to be understood that the invention is not limited to this precise method and form of apparatus, and that changes may be made in either without departing from the scope of the invention.

What is claimed is:

1. A label applicator device for applying a label to the surface of a substantially rectangular package in a selected orientation, comprising:

package conveyor means for presenting a package at an applicator station, control means for selecting first or second label orientations, applicator means, responsive to said control means, for receiving a label at a label output station and for applying said label to the surface of said package, said label being applied in a first orientation with respect to said package or in a second orientation with respect to said package, said second orientation being rotated approximately 90° with respect to said first orientation.

2. The label applicator device of claim 1 in which said applicator means comprises means for receiving a label at a label output station and either applying said label to said package surface after rotation of said label in its plane by approximately 90° or applying said label to said package surface without rotation of said label.

3. The label applicator device of claim 1 in which said control means comprises manually actuatable control means, movable between a first control position in which said first orientation is selected and a second control position in which said second orientation is selected.

4. The label applicator device of claim 3 in which said applicator means comprises:

an applicator head having a rotatable head portion and a nonrotatable head portion, said rotatable head portion defining a vacuum opening in a label contacting surface, means for moving said head to said label output station for receipt by said head of a label on said label contacting surface and for moving said head from said label output station to said applicator station, and means, responsive to said control means, for rotating said rotatable portion of said head after a label is received thereby and prior to application of said label to a package, whereby said label may be rotated in its plane by approximately 90°.

5. The label applicator device of claim 4 in which said label output station is substantially above said applicator station and in which said means for moving said head includes means for vertically moving said head between said label output station and said applicator station, whereby a label may be applied to the top surface of a package.

6. The label applicator device of claim 5 in which said means for moving said head comprises head support means, attached to said nonrotatable head portion, for supporting said head, and head drive means for raising and lowering said head support means.

7. The label applicator of claim 6 in which said means, responsive to said control means, for rotating said rotatable head portion comprises:

cam means defining a stationary cam surface, cam follower means mounted on said head support means in contact with said cam surface for movement therealong in synchronism with vertical movement of said head, means for biasing said cam follower means into contact with said cam means, and cam linkage means, connecting said cam follower means and said rotatable head portion, for rotating said rotatable head portion as said cam follower means moves along said cam surface.

8. The label applicator of claim 7 in which said means for biasing said cam follower means comprises spring means for urging said cam follower means into contact with said cam surface.

9. The label applicator of claim 7 in which said cam means comprises means defining a first cam surface for contact with said cam follower means, said first cam surface configured to produce rotation of said rotatable head portion as said cam follower means moves therealong, and means, connected to said control means, defining a second cam surface and movable into position adjacent said first cam surface such that said cam follower means contacts said second cam surface instead of said first cam surface, said second cam surface configured to prevent rotation of said rotatable head portion as said cam follower means moves therealong, whereby said cam follower means contacts said first cam surface and said rotatable head portion is rotated when said control means is in said second control position, and said cam follower means contacts said second cam surface and said rotatable head portion is not rotated when said control means is in said first control position.

10. The label applicator of claim 9 in which said control means comprises a control lever movable between first and second control positions.

* * * * *